United States Patent Office 3,431,191
Patented Mar. 4, 1969

3,431,191
PROCESS FOR PRODUCING 5,10-SECO-STEROIDS
Georg Anner, Basel, Basel-Land, Charles Meystre, Reinach, Jaroslav Kalvoda, Basel, Basel-Land, and Hellmut Ueberwasser, Riehen, Switzerland, assignors to Ciba Corporation, New York, N.Y., a corporation of Delaware
No Drawing. Filed June 28, 1965, Ser. No. 467,691
Claims priority, application Switzerland, July 3, 1964, 8,781
U.S. Cl. 204—158
Int. Cl. C07c 171/07; B01j 1/10
33 Claims

ABSTRACT OF THE DISCLOSURE

Process for the manufacture of new 5,10-seco-steroids of the androstane and pregnane series that contain in position 10 at least one hydrogen atom or, starting from it, a double bond, wherein a 5-hydroxy-steroid of the androstane or pregnane series containing no further oxidizable hydroxyl group is reacted with a member selected from the group consisting of an oxidizing heavy-metal acylate while being irradiated with ultraviolet light, and a compound that contains monovalent, positive iodine. The products of the invention are useful in the same manner as the comparable 5,10-cyclo derivatives but their metabolizing rate is more favorable. They are, thus, useful as andogens, anabolics, progestatives and agents capable of regulating the mineral metabolism and the blood cholesterol level, as well as being intermediates.

---

The present invention relates to the manufacture of new 5,10-secosteroids of the androstane and pregnane series that contain in position 10 at least one hydrogen atom or, starting from it, a double bond.

The ring system or side chain of the new compounds contains one or several substituents of known, pharmacologically active androstane or pregnane compounds, for example free, esterified or etherified hydroxyl groups, for example acyloxy groups of carboxylic acids containing up to 20 carbon atoms, such as acetoxy, trifluoroacetoxy, propionyloxy, pivalyoxy, benzoyloxy or sulfobenzoyloxy groups, lower alkoxy such as methoxy or ethoxy groups, the tetrahydropyranyloxy group, free or ketalised oxo groups, e.g. lower alkylenedioxy such as ethylenedioxy, 1,2- or 1,3-proplyenedioxy groups, lower aliphatic hydrocarbon radicals, e.g. lower alkyl, alkylene, alkenyl or alkinyl groups such as methyl, ethyl, propyl, isopropyl, methylene, vinyl, allyl, ethinyl or propargyl groups, and halogen such as fluorine, chlorine or bromine atoms. They may also contain one or several additional double bonds.

The new compounds correspond preferably to the formulae

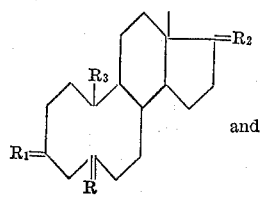 and 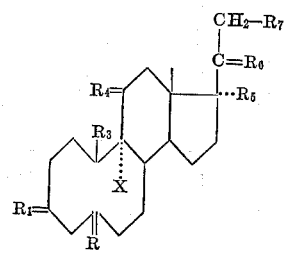

where R and $R_4$ each is hydrogen, an oxo group, or a hydrogen atom and an α- or β-positioned free or esterified hydroxy; $R_1$ and $R_6$ each is an oxo or a lower alkylene dioxy group, or a hydrogen and an α- or β-positioned free, esterified or etherified hydroxyl; $R_2$ is oxo or lower alkylene dioxy or hydrogen and a β-positioned free, esterified or etherified hydroxyl or a lower aliphatic hydrocarbon radical having up to 6 carbon atoms, preferably 1 to 3 carbon atoms; $R_3$ is hydrogen or methyl; $R_5$ and $R_7$ each is hydrogen or free, esterified or etherified hydroxyl and X is hydrogen, fluorine, chlorine or bromine; their 1(10)-dehydro derivatives, the 4(5)-dehydro and 1(10), 4(5)-bisdehydro derivatives of the 5-unsubstituted compounds.

The action of the afore-mentioned compounds is similar to that of comparable 5,10-cyclo derivatives, but their metabolising rate is more favorable. They can therefore be used as androgens, anabolics, progestatives and as agents capable of regulating the mineral metabolism and the blood cholesterol level. They may also be used as intermediates for the manufacture of other, especially pharmacologically active, medicaments.

Of special value are the compounds of the formulae I and II—where R and $R_4$ each is hydrogen, oxo or hydrogen and α- or β-hydroxy; $R_1$ is oxo, or hydrogen and an α- or β-hydroxyl, -lower alkanoyloxy or -sulfobenzoyloxy; $R_2$ is oxo or β-hydoxyl or β-lower alkanoyloxy and hydrogen or a lower alkyl, alkenyl or alkinyl; $R_3$ is hydrogen or methyl; $R_6$ is oxo, or hydrogen and α- or β-hydroxyl or lower alkanoyloxy; $R_5$ and $R_7$ each is hydrogen, hydroxyl or lower alkanoyloxy and X is hydrogen or fluorine—their 1(10)-dehydro derivatives, the 4(5)-dehydro and 1(10), 4(5)-bisdehydro derivatives of the 5-unsubstituted compounds.

The new compounds are obtained when a 5-hydroxy-steroid of the androstane or pregnane series that contains no further oxidazable hydroxyl group is reacted with an oxidizing heavy-metal acylate preferably while being irradiated with ultraviolet light and, if desired in the resultng $\Delta^{1(10)}$-5-oxo-5,10-secosteroid the double bond and/or the oxo group is hydrogenated and/or at any stage of the process any protected oxo or hydroxyl groups present in the process products are liberated or eliminated and/or free hydroxyl groups are esterified or etherified.

Oxidatively acting heavy-metal acylates are especially those of tetravalent lead whose acyloxy radicals are derived from lower aliphatic, cycloaliphatic, araliphatic or aromatic carboxylic acids, e.g. lead tetra-acetate, -propionate, -hexahydrobenzoate, -phenylacetate or -benzoate. Preferred use is made of lead tetraacetate.

The reaction of the invention with the oxidizing heavy-metal acylate is advantageously carried out in an inert solvent, for example, in an aliphatic, cycloaliphatic or aromatic hydrocarbon such as pentane, hexane, heptane, cyclohexane, methylcyclohexane, dimethylcyclohexane, especially benzene or toluene, in the presence or absence of an inert gas and/or basic agent, for example an alkaline earth metal carbonate or a tertiary base, such as calcium carbonate or pyridine, collidine or trimethylamine, and advantageously at the boiling point of the solvent used.

A suitable source of light is artificial or strong natural light; preferred use is made of ultraviolet light as emitted by mercury vapour low-pressure or high-pressure burners, or strong sunlight. The irradiation is advantageously performed at a temperature ranging from 0 to 80° C., preferably from 0 to 30° C.

The process of this invention may be performed, in an advantageous manner, as follows: The starting material is dissolved or suspended in a solvent that is inert towards the heavy-metal acylate, for example in a hydrocarbon such as a cycloalkane, e.g. cyclohexane, methylcarbon such as a cycloalkane, e.g. cyclohexane, methyl- or dimethyl-cyclohexane or preferably in benzene or toluene, a lead tetraacyclate, advantageously lead tetraacetate, and a basic agent, e.g. an alkaline earth metal carbonate or a tertiary nitrogen base, such as calcium carbonate or especially pyridine, are added, and the reaction mixture is then stirred and irradiated in the presence or absence of an inert gas at room temperature or with heating.

A further method to obtain the new compounds consists in reacting 5-hydroxy-steroids that contain no further oxidizable hydroxyl group with compounds that contain monovalent, positive iodine and, if desired, in the resulting $\Delta^{1(10)}$-5-oxo-5,10-secosteroids the double bond and/ the oxo group is hydrogenated and/or at any stage of the process any protected oxo or hydroxyl groups present in the process products are liberated or eliminated and/or free hydroxyl groups are esterified or etherified.

Compounds that contain monovalent, positive iodine are, for example, N-iodocarboxylic acid amides or imides, such as N-iodoacetamide or N-iodosuccinimide—reacted preferably in the presence of free- iodine—cyanogen iodide, iodine halides such as iodine chloride or bromide, 4-iodo-1,3-dimethoxy-benzene, in the presence of Lewis acids such as boron trifluoride, diiodoacetylene and especially hypoiodous acid and its derivatives, for example alkyl hypoiodites and acyl hypoiodites. Alkyl hypoiodites are advantageously prepared by reacting iodine with alkanols, especially lower alkanols such as methanol, ethanol, propanol or butanol, in the presence of heavy-metal oxides such as silver, mercury or lead oxide. Acyl hypoiodites are advantageously prepared by reacting iodine upon heavy-metal acylates, especially those of lower aliphatic, cycloaliphatic, monocyclic aromatic or araliphatic carboxylic acids such as acetic, trifluoracetic, propionic, hexahydrobenzoic, benzoic or phenylacetic acid, with silver, mercury or lead. According to a particularly favorable method the acyl hypoiodites are obtained by reacting iodine upon acylates of tetravalent lead, for example dialkyl lead acylates, or especially lead tetraacylates, for example those of the carboxylic acids listed above. It is often advantageous to manufacture the iodine reagent, especially the acyl hypoiodites, in the manner indicated and in the presence of the 5-hydroxysteroid used as starting material, i.e. in the reaction mixture itself.

The present process may be performed, for example, thus: The starting material is dissolved or suspended in a solvent that is inert towards the iodine reagent, for example in a hydrocarbon such as a cycloalkane such as cyclohexane, methylcyclohexane or dimethylcyclohexane, or in a halogenated hydrocarbon such as carbon tetrachloride or hexachlorobutadiene, whereupon a lead tetraacylate, preferably lead tetraacetate, iodine and, if desired, also a basic agent, for example an alkaline earth metal carbonate or a tertiary nitrogen base such as calcium carbonate or pyridine, are added, and the reaction mixture is stirred in the presence or absence of an inert gas at room temperature or with heating, advantageously at the boiling point of the solvent used, until the iodine coloration disappears. The reaction can be accelerated by irradiation of the reaction mixture with visible and/or ultraviolet light or with the aid of a catalyst. The catalysts to be used are the radical starters known for lead tetraacylate+iodine reactions, such α,α'-azodiisobutyronitrile. In the same or a suitably modified manner the process of the invention may also be performed with other iodine reagents.

The starting materials used in the aforesaid processes are known or, insofar as they are new, they can be prepared by known methods. Thus, for example, the Δ-steroids or $\Delta^5$-steroids of the androstane or pregnane series, form on reaction with a per-acid or a hypohalous acid the steroid-4,5-epoxides or steroid-5,6-epoxides which can be converted by reduction, e.g. with complex light-metal hydrides, such as alkalimetal boro- or aluminumhydrides, especially sodium borohydride or lithium aluminumhydride, generally in a preponderant proportion, into the desired 5-hydroxysteroids.

Preferred starting materials are those of the formulae (III) and (IV)

where $R_1$ stands for oxo, lower alkylenedioxy groups or hydrogen and α- or β-positioned etherified or esterified hydroxyl groups; $R_2$ for lower alkylenedioxy or hydrogen and β-positioned etherified or esterified hydroxyl or a lower aliphatic hydrocarbon radical having up to 6 preferably 1 to 3 carbon atoms, $R_3$ for hydrogen or methyl, $R_4$ for hydrogen or hydrogen and an α- or β-positioned esterified hydroxyl, $R_5$ and $R_7$ each for hydrogen, etherified or esterified hydroxyl, $R_6$ for lower alkylenedioxy or hydrogen and α- or β-positioned etherified or esterified hydroxyl or $R_5+R_6$ and $R_6+R_7$ together represent lower alkylenedioxy, and X stands for hydrogen, fluorine, chlorine or bromine.

Above all, there are used starting materials of the Formulae III and IV where $R_1$ and $R_6$ each represent ethylenedioxy or hydrogen and lower alkanoyloxy, $R_2$ stands for ethylenedioxy or hydrogen and β-lower alkanoyloxy or lower alkyl, alkenyl or alkinyl; $R_3$ for methyl; $R_4$ for hydrogen or hydrogen and lower alkanoyloxy; $R_5$ and $R_7$ each for hydrogen or lower alkanoyloxy or $R_5+R_6$ and $R_6+R_7$ together represent methylenedioxy, and X stands for hydrogen.

Specifically, the following starting materials may be mentioned: 3β,17β-diacetoxy-5α-hydroxy-androstane, 3,3-ethylenedioxy - 5α - hydroxy - 17β - acetoxy - 17α - methylandrostane, 3,3;20,20 - bisethylenedioxy - 5α - hydroxypregnane and 3,3-ethylenedioxy-5α-hydroxy-11α-acetoxy-17α,20;20,21-bis-methylenedioxy-pregnane.

The reaction product is generally obtained as a mixture of the cis-trans isomeric $\Delta^{1(10)}$-5-oxo-5,10-secosteroids, as represented by the following simplified scheme of reactions:

This mixture can be separated into its constitutents in a manner known per se, for example by crystallization or chromatography.

If desired, the double bond in a resulting $\Delta^{1(10)}$-5-oxo-5,10-secosteroid can be hydrogenated by a known method, for example by treatment with catalytically activated hydrogen. Likewise, the oxo group can be reduced to the hydroxy group, for example by treatment with a complex light-metal hydride, especially alkali metal borohydride or -aluminum hydride such as sodium borohydride or lithium aluminum hydride, or, for example eliminated by Wolff-Kishner.

Any protected oxo or hydroxyl groups present in the process products, for example ketalized oxo groups or esterified or etherified hydroxyl groups, can be liberated in the known canner, ketal and ether groupings advantageously by acid hydrolysis and ester groupings by alkaline hydrolysis or hydrogenolysis. The latter may, if desired, be carried out concurrently with the reduction of the 5-keto group. A resulting hydroxy compound can be esterified by a known method, for example with a reactive functional derivative of a carboxylic or sulfonic acid, for example the anhydrides or halides of the acids mentioned above; or they may be etherified, for example with lower alkylhalides or dihydropyran.

The invention includes also any modification of the process in which an intermediate obtained at any stage is used as starting material and the remaining step/steps is/are carried out or the process is discontinued at any stage thereof, or in which a starting material is formed under the reaction conditions or used in the form of a salt or other derivative.

The new, pharmacologically active compounds may be used in the form of pharmaceutical preparations which contain them in admixture or conjunction with organic or inorganic, solid or liquid pharmaceutical excipients suitable for parenteral, enteral or local administration. Suitable excipients are substances that do not react with the new substances, such as water, vegetable oils, benzyl alcohols, polyethylene-glycols, gelatin, lactose, starches, magnesium stearate, talcum, white petroleum jelly, cholesterol or other medicinal excipients. Preferably manufactured preparations are these for parenteral administration, especially solutions, in the first place oily or aqueous solutions, also suspensions, emulsions or implants; for enteral administration there are prepared also tablets or dragees, and for local administration also ointments or creams. If desired, the preparations may be sterilized or they may contain auxiliaries such as preserving, stabilizing, wetting or emulsifying agents, salts for regulating the osmotic pressure or buffers. They may also contain further therapeutically useful substances.

In veterinary medicine the new compounds may be used, not only in one of the forms mentioned above, but also in the form of feeding stuffs or as additives to feeding stuffs, using the conventional extending and diluting agents, or feeding stuffs.

The following examples illustrate the invention without restricting its scope.

Example 1

A suspension of 5.0 g. of pre-dried lead tetraacetate and 2.0 g. of calcium carbonate in 100 ml. of cyclohexane is boiled for a short time, then mixed with 1.25 g. of iodine and 1.0 g. of 3,3;20,20-bisethylenedioxy 5α-hydroxy-pregnane (melting at 148° to 149° C.) and refluxed for 40 minutes while being stirred and irradiated with a 500-watt lamp. The colorless reaction mixture is cooled, the inorganic matter is filtered off, and the residue is rinsed with cyclohexane and ether; the filtrate is successively washed with 5% sodium thiosulfate solution and with water, dried and evaporated in a water-jet vacuum. The resulting crude product (1.16 g.) consists according to its thin-layer chromatogram (eluant benzene+ethyl acetate 4:1 substantially of 2 compounds and no longer contains any starting material. Chromatography of the mixture on 50-times its own weight of neutral alumina (activity II) yields, in addition to 150 mg. of an aromatically scented oil (eluted with petroleum ether+benzene 1:1), 100 mg. of an iodine-containing compound of unknown constitution, 310 mg. of isomer (I) (eluted with benzene) and 435 mg. of isomer (II) of 3,3;20,20-bisethylenedioxy-5-oxo-5,10-seco-$\Delta^{1(10)}$-pregnene (eluted with benzene+ethyl acetate 95:5).

The isomer (I) melts at 119° to 120° C. after three recrystallizations from ether+petroleum ether. The infrared spectrum of the compound contains bands inter alia at 5.89, 9.22, 9.40, 9.56, 9.85, 10.56 and 11.62μ. The RD curve displays a negative Cotton effect. Optical rotation $[\alpha]_D^{20}=-6°$ (c.=0.1660 in dioxane). The nuclear magnetic resonance spectrum corresponds with the constitution indicated.

The isomer (II) melts at 163° to 164° C. after recrystallization from methylene chloride+ether+petroleum ether and displays in the infrared spectrum bands, inter alia, at 5.88, 8.40, 9.05, 9.34, 9.55 and 10.55μ. The RD curve displays a positive Cotton effect. Optical rotation $[\alpha]_D^{20}=+51°$ (c.=0.1506 in dioxane).

The starting material is accessible by reducing 3,3;20,20-bisethylenedioxy - 5α,6 - oxidopregnane with lithium aluminum hydride.

Example 2

A solution of 350 mg. of the isomer (II) described in Example 1 of 3,3;20,20-bisethylenedioxy-5-oxo-5,10-seco-$\Delta^{1(10)}$-pregnene in 10 ml. of tetrahydrofuran is dropped into a suspension of 100 mg. of lithium aluminum hydride in 15 ml. of tetrahydrofuran with stirring and cooling. The reaction mixture is refluxed for 2 hours, then cooled, mixed successively dropwise with cooling with a mixture of 0.4 ml. of ethyl acetate in 5 ml. of tetrahydrofuran and of 0.4 ml. of water in 5 ml. of tetrahydrofuran; 10 g. of anhydrous sodium sulfate are added, and the inorganic matter is filtered off. The filter residue is washed with tetrahydrofuran and methylene chloride, and the filtrate is evaporated in a water-jet vacuum. The resulting amorphous 3,3;20,20 - bisethylenedioxy - 5ξ-hydroxy-5,10-seco-$\Delta^{1(10)}$-pregnene (348 mg.) crystallizes on being sprinkled with ether or with acetone and displays in the infrared spectrum, inter alia, bands at 2.86, 7.32, 8.70, 8.95, 9.17, 9.28, 9.05 and 10.57μ. According to its thin-layer chromatogram (eluant: benzene+ethyl acetate 9:1, 4:1 and 1:1 mixtures) the crude product is a preparation unitary to the extent of 90 to 95%. It contains only traces of the second alcohol isomeric at the $C_5$ atom. (M.P. 125–126, from ether-petroleum ether).

Example 3

340 mg. of the 3,3;20,20-bisethylenedioxy-5ξ-hydroxy-5,10-seco-$\Delta^{1(10)}$-pregnene described in Example 2 are dissolved in 5 ml. of acetone with addition of 60 mg. of para-toluenesulfonic acid, and the whole is left to itself for 18 hours at 25° C. The reaction solution is then diluted with water, extracted with methylene chloride, the organic layer is washed with sodium bicarbonate solution and then with water until it is neutral, dried and evaporated in a water-jet vacuum, to yield 270 mg. of crude 3,20 - dioxo - 5ξ-hydroxy-5,10-seco-$\Delta^{1(10)}$-pregnene which displays in the infrared spectrum bands inter alia at 2.90, 5.89, 5.93, 7.41, 8.29, 8.50 and 9.75μ. After two recrystallizations from methylene chloride+ether it melts at 116–117°.

Example 4

A mixture of 150 mg. of the isomer (II) of 3,3;20,20-bisethylenedioxy - 5 - oxo - 5,10-seco-$\Delta^{1(10)}$-pregnene described in Example 1 and 40 mg. of para-toluenesulfonic acid is dissolved in 4 ml. of acetone, and the solution is kept for 18 hours at 25° C. The reaction mixture is then mixed with water, extracted with methylene chloride, the organic layer is washed neutral with water, dried and evaporated in a water-jet vacuum, to yield 105 mg. of crude crystalline 3,5,20 - trioxo-5,10-seco-$\Delta^{1(10)}$-pregnene which after twice recrystallizations from methylene chloride+ether melts at 143° to 145° C. The infrared spectrum contains bands, inter alia, at 5.80–5.90, 7.26, 7.40, 9.25, 9.86 and 11.80μ. When a base is added, there appears in the ultraviolet spectrum a strong maximum at 305 mμ which corresponds to the enolized form of the β-diketone system.

Example 5

A mixture of 10.0 g. of 3β,17β-diacetoxy-5α-hydroandrostane, 50.0 g. of lead tetraacetate and 12.5 g. of iodine in 750 ml. of cyclohexane is irradiated as described in Example 1. Similar working up yields 11.5 g. of a crude product which furnishes on direct crystallization from ether+pentane 3.85 g. of pure 3β,17β-diacetoxy-5-oxo-5,10-seco-Δ$^{1(10)}$-androstene. The mother liquor furnishes on chromatography further amounts of the same product. After having been recrystallized three times from ether +petroleum ether the compound melts at 158° to 159° C. The RD curve displays a positive Cotton effect. Optical rotation [α]$_D^{20}$=+50° (c.=0.2% in dioxane). The mother liquor contains the second isomer, which is obtained only in amorphous form.

Example 6

A solution of 1.0 g. of 3β,17β-diacetoxy-5-oxo-5,10-seco-Δ$^{1(10)}$-androstene in 100 ml. of glacial acetic acid is hydrogenated in the presence of 500 mg. of platinum oxide. When 2 equivalents of hydrogen have been absorbed, hydrogenation is discontinued, the catalyst is filtered off and the filtrate evaporated in a water-jet vacuum.

The crude amorphous 3β,17β-diacetoxy-5ξ-hydroxy-5,10-secoandrostane (1.05 g.) is dissolved as it is in acetone and reacted with 1.1 equivalents of 8 N-chromic acid in dilute sulfuric acid at 0° C. After the usual working up there are obtained 980 mg. of crude 3β,17β-diacetoxy-5-oxo-5,10-secoandrostane which can be purified by chromatography on silica gel.

This compounds melts at 151–152° and has a RD curve which displays a positive Cotton effect. Optical rotation [α$_D^{20}$=+56° (c.=0.2% in dioxane).

Example 7

A solution of 50 mg. of 3β,17β-diacetoxy-5-oxo-5,10-seco-Δ$^{1(10)}$-androstene in 10 ml. of tertiary butanol is mixed with 100 mg. of potassium tertiary butylate and stirred for 30 minutes under nitrogen. The colored reaction solution is then poured into ice water, diluted with ether, acidified with dilute sulfuric acid and processed in the usual manner by washing until neutral, drying and evaporation. By chromatography of the crude product obtained (345 mg.) on silica gel there are obtained 120 mg. of pure 5-oxo-17α-acetoxy-5,10-seco-Δ$^3$-androstene.

Example 8

A suspension of 4 g. of lead tetraacetate and 1.6 g. of calcium carbonate in 100 ml. of cyclohexane is stirred and refluxed for a short time and then mixed with 1 g. of 3,3 - ethylenedioxy - 5α - hydroxy - 11 - oxo - 17α,20; 20,21-bismethylenedioxypregnane and 1.2 g. of iodine. The suspension is then refluxed for 2½ hours while being irradiated with a 250 watt lamp. After cooling, the undissolved matter is suctioned off and washed with ethyl acetate. The filtrate is agitated with 5% potassium iodide and sodium thiosulfate solution and finally with water, dried and evaporated under vacuum. The resulting crude product (1.5 g.) is chromatographed on 30 g. of alumina (activity II). Pentane+benzene (1:1) eluates furnish oily products. From the residues of the following benzene eluates there are obtained after recrystallization from ether iodine-containing crystals melting at 215° to 218° C. with decomposition. The following ether eluates yield on evaporation a total of 450 mg. of a crystalline mixture which is dissolved in ether; the solution is boiled for a short time, filtered and evaporated under vacuum. The residue is dissolved in benzene and once more chromatographed on 15 g. of alumina (activity III). When the benzene eluates no longer leave a residue on evaporation, elution with ether is performed. When these ethereal eluates are concentrated and mixed with pentane, they yield colorless crystals of 3,3-ethylenedioxy-5,11-dioxo-17α,20;20,21 - bismethylenedioxy - 5,10 - seco - Δ$^{1(10)}$-pregnene which, after two recrystallizations from ether +pentane, melts at 226° to 234° C. In the nuclear magnetic resonance spectrum there appears a 19-methyl band displaced towards 101 cycles (in the starting material: 69 cycles) which suggests a methyl group on an unsaturated carbon atom. The infrared spectrum (in methylene chloride) contains no hydroxyl band but there is an intensified carbonyl band at 5.90μ.

When the protective groups are carefully split with 16% aqueous perchloric acid in tetrahydrofuran at 20° C., the product yields 3,5,11,20 - tetraoxo - 17α,21 - dihydroxy-5,10-seco-Δ$^{1(10)}$-pregnene.

The starting material can be prepared thus:

A solution of 10 g. of 3,3-ethylenedioxy-11-oxo-17α,20; 20,21-bismethylenedioxy-Δ$^5$-pregnene in 500 ml. of methylene chloride is mixed at 0° C. with 15 g. of metachloroperbenzoic acid. The suspension is stirred for one hour at 0° C., whereupon all passes into solution. The solution is washed with dilute ice-cold sodium hydroxide solution and water, dried and evaporated under vacuum. Recrystallization of the residue from methylene chloride +methanol yields 3,3-ethylenedioxy-5,6α-oxido - 11 - oxo-17α,20;20,21 - bismethylenedioxypregnane. 5 g. of the crude oxido compound are dissolved in 500 ml. of tetrahydrofuran and mixed at 20° C. with 2.0 g. of lithium aluminum hydride. The resulting suspension is agitated for 15 minutes, mixed carefully under nitrogen with a solution of 25 g. of ammonium sulfate in 36 ml. of water, the insoluble salts are suctioned off, rinsed with methylene chloride and the clear filtrate is evaporated under vacuum. The residue, crude 3,3-ethylenedioxy-5α,11-dihydroxy-17, 20;20,21-bismethylenedioxy-pregnane, is dissolved in 100 ml. of pyridine and mixed at 20° C. with a solution of 5 g. of chromium trioxide in 30 ml. of water and 20 ml. of pyridine. After 15 hours the excess of chromic acid is decomposed by adding an ice-cold sodium bisulfite solution and ice; the reaction mixture is diluted with ethyl acetate, successively washed with dilute sodium carbonate solution and water, with ice-cold 1.4 N-phosphoric acid and with water, dried and evaporated under vacuum. The residue is recrystallized from methylene chloride+ methanol, to yield 3.5 g. of 3,3-ethylenedioxy-5α-hydroxy-11-oxo-17,20;20,21-bismethylenedioxypregnane melting at 264° to 274° C.

Example 9

A solution of 1.0 g. of 3β,17β-diacetoxy-5α-hydroxyandrostane (melting at 179 to 181° C.) and 6.0 g. of lead tetraacetate in 350 ml. of absolute benzene and 2 ml. of pyridine is irradiated in a cylindrical irradiation apparatus with centrally disposed light source (mercury vapour high-pressure burner) cooled with a Pyrex cooling finger until the positive reaction for lead tetraacetate has disappeared. The precipitated lead diacetate is then filtered off and the filtrate evaporated in a water-jet vacuum. According to its thin-layer chromatogram (eluant: toluene+ethyl acetate 4:1) the resulting crude product is free from starting material and contains about 60% of a mixture of the two isomers of 3β,17β-diacetoxy-5-oxo-5,10-seco-Δ$^{1(10)}$-androstane. Direct crystallization or chromatography on alumina (activity II), followed by crystallization from ether+petroleum ether, furnishes the pure isomer I (melting at 153 to 155° C.; [α]$_D^{20}$= +56°±5° (c.=92% dioxane); Cotton effect positive) in a yield of 35 to 40%.

Example 10

1.0 g. of 3,3;20,20 - bisethylenedioxy - 5α - hydroxypregnene and 6.0 g. of lead tetraacetate are dissolved in a mixture of 350 ml. of benzene and 2 ml. of pyridine and the whole is irradiated under the conditions described in Example 9 until the reaction for lead tetraacetate is negative. The precipitated lead diacetate is filtered off and the filtrate evaporated in a water-jet vacuum, to yield 1.08 g. of a colorless amorphous crude product. Chromatography on alumina (activity II) furnishes 30% of isomer I (melting at 118 to 120° C., after recrystallization from ether+petroleum ether; Cotton effect negative) and about 38% of isomer II (melting at 161 to 163° C., after recrystallization from methylenechloride+ether; Cotton effect positive) of 3,3;20,20-bisethylenedioxy-5-oxo-5,10-seco-Δ$^{1(10)}$-pregnene.

The same product is obtained by refluxing the said starting material 12 hours in benzene with lead tetraacetate and in the presence of calcium carbonate without irradiation.

Example 11

A solution of 1.4 g. of isomer I of 3,3;20,20-bisethylenedioxy-5-oxo-5,10 - seco - $\Delta^{1(10)}$ - pregnene in 30 ml. of tetrahydrofuran is stirred dropwise into a suspension of 300 mg. of lithium-aluminum hydride in 50 ml. of tetrahydrofuran. The reaction mixture is then refluxed for 2 hours, then cooled to about 0° C., the excess reducing agent decomposed by adding the calculated amount of ethyl acetate and water, the inorganic matter is filtered off and the filtrate dried and evaporated. Recrystallization of the crude product (1.4 g.) from methylene-chloride + ether furnishes the pure 3,3;20,20-bisethylenedioxy-5ξ-hydroxy-5,10-seco-$\Delta^{1(10)}$-pregnene (844 mg.) melting at 129 to 131° C. $[\alpha]_D^{20} = +43° \pm 2°$ (c.=0.690).

Example 12

By the methods described in the preceding examples there are obtained from 3.0 g. of 3,3-ethylenedioxy-5α-hydroxy-17α-methyl-17β-acetoxy-androstane via the isomeric 3,3 - ethylenedioxy - 5-oxo-17α-methyl-17β-acetoxy-5,10-seco-$\Delta^{1(10)}$-androstenes, 400 mg. of a mixture of the isomeric 3 - oxo - 17α - methyl-17β-hydroxy-5,10-seco-$\Delta^{1(10),4}$-androstadienes.

Example 13

4.5 g. of 3,3 - ethylenedioxy - 5α - hydroxy - 11-oxo-17α,20;20;21-bismethylenedioxy-pregnane are added to a stirred suspension of 6.0 g. of lead tetraacetate and 2.0 g. of calcium carbonate in 250 ml. of cyclohexane, and the whole is refluxed for 15 hours. The cooled reaction mixture is filtered through diatomaceous earth, the residue is rinsed with ethyl acetate, and the filtrate washed with 5% potassium iodide solution and sodium thiosulfate solution and with water, dried and evaporated in a water-jet vacuum. The resulting crude product (5.1 g.) is dissolved in a 1:1-mixture of petroleum ether and benzene and chromatographed on 35 times its own weight of neutral alumina (activity II). In addition to about 500 mg. of an aromatic oil (reaction product of cyclohexane) and about 2.5 g. of unreacted starting material recovered there are obtained 0.8 g. of the crude isomeric mixture of 3,3-ethylenedioxy-5,11-dioxo-17α,20;20,21-bismethylenedioxy-5,10-seco-$\Delta^{1(10)}$-pregnene.

The separation of this mixture may be performed as described in Example 8.

What is claimed is:

1. Process for the manufacture of new 5,10-seco-steroids of the androstane and pregnane series that contain in position 10 at least one hydrogen atom or, starting from it, a double bond, wherein a 5-hydroxy-steroid of the androstane or pregnane series that contains no further oxidizable hydroxyl group is reacted with a member selected from the group consisting of an oxidizing heavy-metal acylate while being irradiated with ultraviolet light, and a compound that contains monovalent, positive iodine.

2. Process as claimed in claim 1, wherein there are used as oxidizing heavy-metal acylates those of tetravalent lead whose acyloxy residues are derived from the group consisting of lower aliphatic, cycloaliphatic, araliphatic and aromatic carboxylic acids.

3. Process as claimed in claim 2, wherein lead tetraacetate is used.

4. Process as claimed in claim 1, wherein the reaction with the oxidizing heavy-metal acylate is carried out in an inert solvent in the presence of a basic agent.

5. Process as claimed in claim 4, wherein an aliphatic, cycloaliphatic or aromatic hydrocarbon is used as inert solvent.

6. Process as claimed in claim 4, wherein an alkaline earth metal carbonate is used as basic agent.

7. Process as claimed in claim 4, wherein a tertiary base is used as basic agent.

8. Process as claimed in claim 7, wherein the reaction is carried out in benzene and in the presence of pyridine.

9. Process as claimed in claim 1, wherein N-iodocarboxylic acid amides are used as compounds that contain monovalent positive iodine.

10. Process as claimed in claim 1, wherein N-iodocarboxylic acid imides are used as compounds that contain monovalent position iodine.

11. Process as claimed in claim 1, wherein alkylhypoiodites are used as compounds that contain monovalent positive iodine.

12. Process as claimed in claim 11, wherein mercury oxide, iodine and a lower aliphatic alcohol are used.

13. Process as claimed in claim 12, wherein the reaction is carried out in a solvent that is inert towards the iodine reagent.

14. Process as claimed in claim 1, wherein acyl hypoiodites are used as compounds that contain monovalent positive iodine.

15. Process as claimed in claim 14, wherein the acyl-hypoiodites are prepared in the reaction medium from heavy-metal acylates and iodine.

16. Process as claimed in claim 15, wherein there are used lead tetraacetate and iodine.

17. Process as claimed in claim 16, wherein a cycloalkane is used as solvent.

18. Process as claimed in claim 14, wherein acyl hypoiodites are used the acyl residue of which is derived from the group consisting of lower aliphatic, cycloaliphatic, monocyclic aromatic and araliphatic carboxylic acids.

19. Process as claimed in claim 18, wherein acetyl-hypoiodites are used.

20. Process as claimed in claim 18, wherein acylates of tetravalent lead are used.

21. Process as claimed in claim 20, wherein a hydrocarbon or halogenated hydrocarbon is used as solvent.

22. Process as claimed in claim 20, wherein a cycloalkane is used as solvent.

23. Process as claimed in claim 1, wherein a 5-oxo-5,10-seco-$\Delta^{1(10)}$-teroid obtained is hydrogenated by treatment with catalytically activated hydrogen.

24. Process as claimed in claim 1, wherein a 5-oxo-5,10-seco-$\Delta^{1(10)}$-steroid obtained is reduced by treatment with a complex light-metal hydride.

25. Process as claimed in claim 24, wherein the reduction is performed with an alkali metal borohydride or -aluminum hydride.

26. Process as claimed in claim 1, wherein a 5-oxo-5,10-seco-$\Delta^{1(10)}$-steroid obtained is reduced by Wolff-Kishner.

27. Process as claimed in claim 1, wherein a compound of the formula

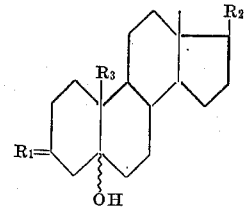

is used as starting material, wherein $R_1$ stands for a member selected from the group consisting of

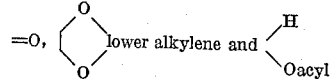

$R_2$ represents a member selected from the group consisting of

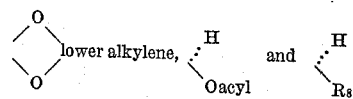

in which $R_8$ stands for a lower aliphatic hydrocarbon having up to 6 carbon atoms, and $R_3$ stands for a member selected from the group consisting of hydrogen and methyl.

28. Process as claimed in claim 1, wherein a compound of the formula

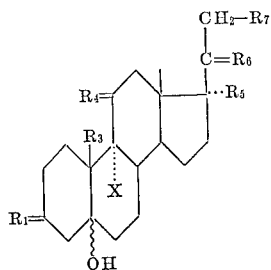

is used as starting material, wherein $R_1$ stands for a member selected from the group consisting of

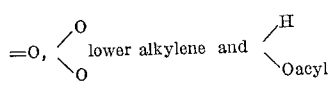

$R_3$ represents a member selected from the group consisting of hydrogen and methyl, $R_4$ stands for a member selected from the group consisting of

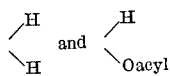

X represents a member selected from the group consisting of hydrogen, fluorine, chlorine and bromine, $R_5$ and $R_7$ each stand for a member selected from the group consisting of hydrogen, esterified and etherified hydroxyl and $R_6$ represents a member selected from the group consisting of

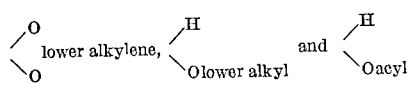

29. Process as claimed in claim 1, wherein a compound of the formula

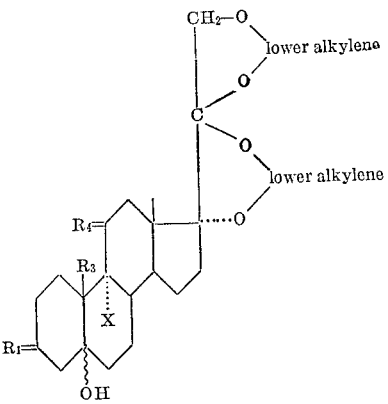

is used as starting material, wherein $R_1$ stands for a member selected from the group consisting of

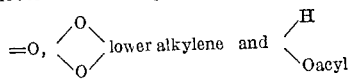

$R_3$ represents a member selected from the group consisting of hydrogen and methyl, $R_4$ stands for a member selected from the group consisting of

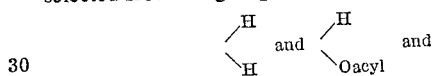

X represents a member selected from the group consisting of hydrogen, fluorine chlorine and bromine.

30. Process as claimed in claim 1, wherein 3,3,20,20-bisethylenedioxy-5-hydroxy-pregnane is used as starting material.

31. Process as claimed in claim 1, wherein 3,3-ethylene-dioxy-5 - hydroxy - 11α - acetoxy - 17,20;20,21 - bismethylenedioxypregnane is used as starting material.

32. Process as claimed in claim 1, wherein 3,3-ethylenedioxy-5-hydroxy-17β-acetoxy-androstane is used as starting material.

33. Process as claimed in claim 1, wherein 3,3-ethylenedioxy-5-hydroxy-11-oxo - 17,20;20,21 - bismethylenedioxy-pregnane is used as starting material.

References Cited

UNITED STATES PATENTS 2,662,854  12/1953  Miescher et al. _____ 204—158
3,338,969  8/1967   Muller et al. _____ 204—488 X H. S. WILLIAMS, *Primary Examiner.*

U.S. Cl. X.R.

260—340.9, 488, 586, 999

UNITED STATES PATENT OFFICE
CERTIFICATE OF CORRECTION

Patent No. 3,431,191     Dated March 4, 1969

Inventor(s) Georg Anner et al

It is certified that error appears in the above-identified patent and that said Letters Patent are hereby corrected as shown below:

Column 10, line 10, "position" should be -- positive --; line 42, "teroid" should be -- steroid --; in the formula, lines 55-63,

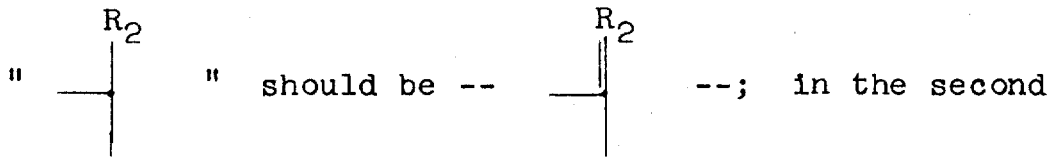

in the second formula, lines 66-69,

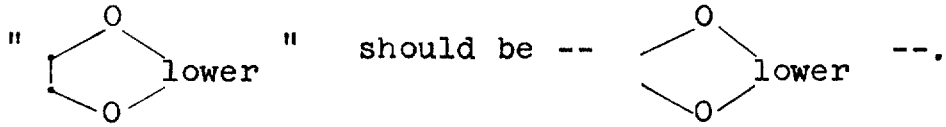

SIGNED AND SEALED
MAY 5 1970

(SEAL)
Attest:

Edward M. Fletcher, Jr.
Attesting Officer

WILLIAM E. SCHUYLER, JR.
Commissioner of Patents